(No Model.) 2 Sheets—Sheet 1.

E. J. JERZMANOWSKI.
PROCESS OF AND APPARATUS FOR MANUFACTURING GAS.

No. 278,146. Patented May 22, 1883.

Witnesses:
Geo. W. Miatt
Geo. H. Evans

Inventor:
Erazm J. Jerzmanowski,
By his Attorney,
E N Dickerson Jr (No Model.) 2 Sheets—Sheet 2.

E. J. JERZMANOWSKI.
PROCESS OF AND APPARATUS FOR MANUFACTURING GAS.

No. 278,146. Patented May 22, 1883.

Witnesses:
Geo. W. Miatt
Geo. H. Evans

Inventor:
Erazm J. Jerzmanowski
By his attorney,
E. N. Dickerson Jr.

UNITED STATES PATENT OFFICE.

ERAZM J. JERZMANOWSKI, OF NEW YORK, N. Y.

PROCESS OF AND APPARATUS FOR MANUFACTURING GAS.

SPECIFICATION forming part of Letters Patent No. 278,146, dated May 22, 1883.

Application filed June 14, 1882. (No model.)

*To all whom it may concern:*

Be it known that I, ERAZM J. JERZMANOWSKI, of the city, county, and State of New York, have invented a new and useful Improvement in Processes of and Apparatus for Manufacturing Gas, of which the following is a full, true, and exact description, reference being had to the accompanying drawings.

My invention relates to improvements in the process of and apparatus for producing hydrogen gas patented to C. M. Tessié du Motay on the 29th day of June, 1880, No. 229,338; and it relates to an improved process of producing what I shall call "hydrogen gas," but which is in fact hydrogen gas carrying certain impurities with it which may be subsequently converted into illuminating-gas by carburation, and to apparatus for carrying the same into effect.

I will first describe my apparatus, which can be readily understood from the accompanying drawings, and subsequently the method of its use and the process to be carried out thereby.

Figure 1:
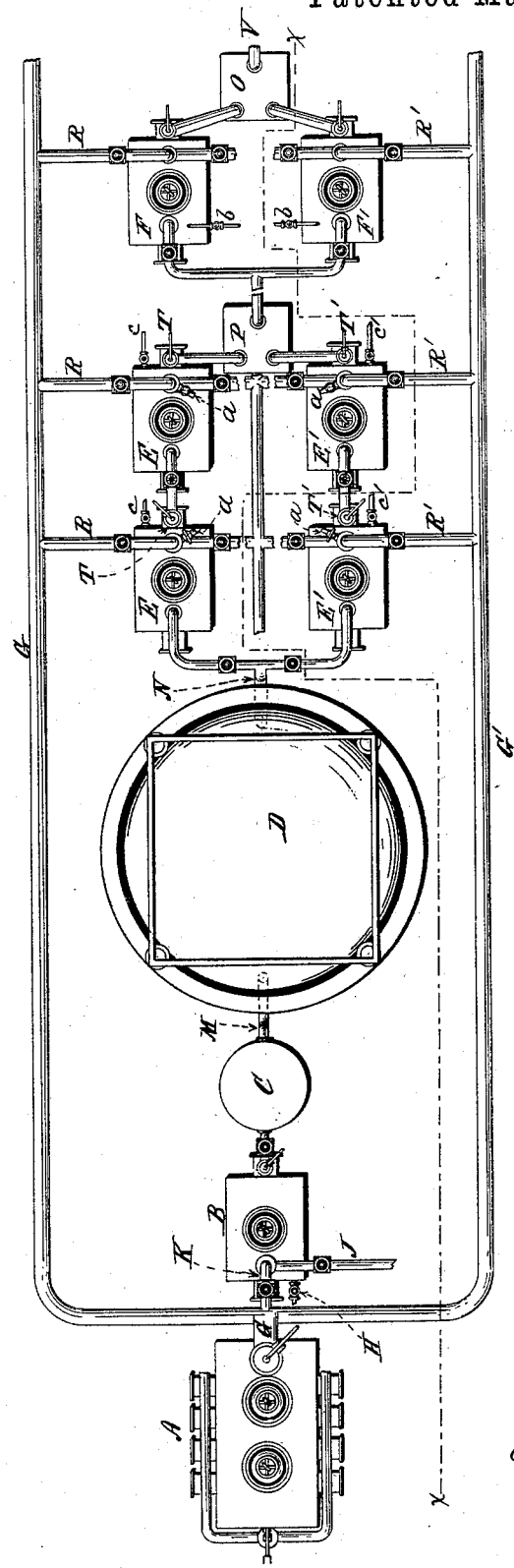
Figure 2:
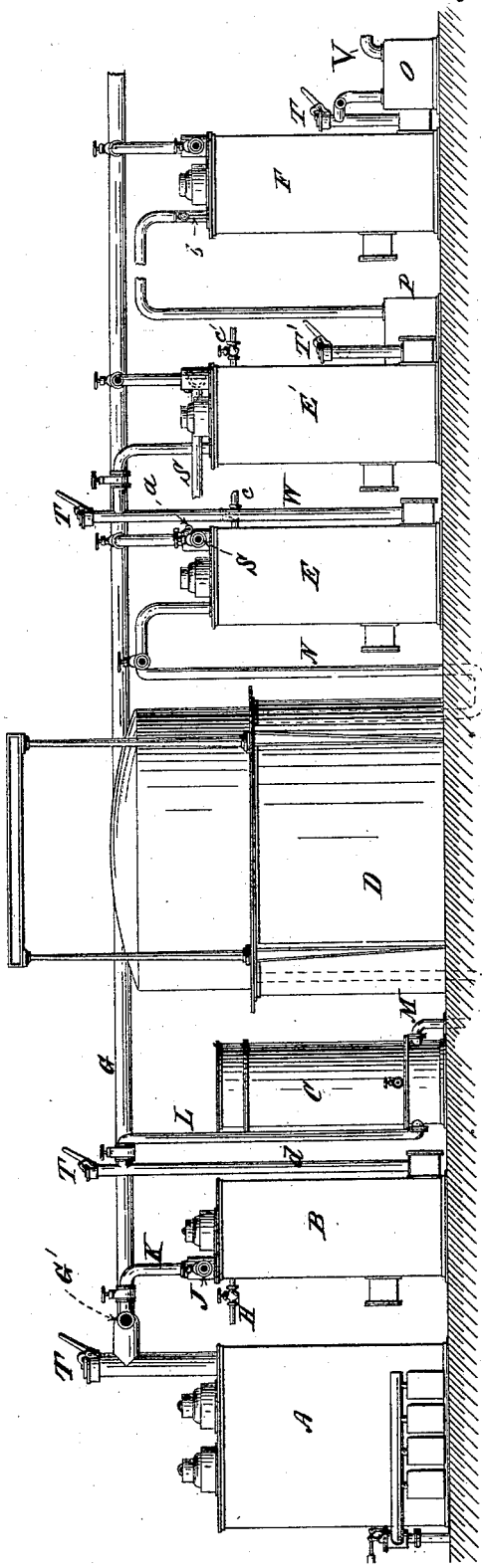

Figure 1 represents a plan view of one arrangement of my apparatus, showing the principal parts; and Fig. 2, a vertical view of the same, partly in section, upon the line $xx$ through Fig. 1.

A represents a gasogene, or generator for producing heating-gas, preferably one of the well-known forms for producing carbonic oxide or other heating-gas. I do not limit myself to any specific form of this apparatus. The gas produced in this apparatus is carried off through the pipes G G′, to be used, as will be subsequently described.

B represents a vertical chamber, designed to hold hot quicklime, which I designate a "lime-furnace."

C represents a cooler for reducing the temperature of the gas produced in the lime-furnace B, and condensing the excess of steam which may be carried by it.

D represents a governing-holder, into which the gas passes from the cooler C, and which governing-holder is designed to maintain a constant pressure upon the gas, and to cause a constant flow through the subsequent portions of the apparatus, thus counteracting the evil results which might occur from an irregular production of gas.

E E E′ E′ represent chambers containing lime designed to absorb the carbonic acid which exists in the gas as it flows from the holder D.

F F′ represent carbureting and fixing apparatuses, whereby the hydrogen gas may be converted into an illuminating-gas, if desired; but my process of producing hydrogen is effective without the use of these carbureting contrivances.

P and O represent washers or hydraulic mains. The motion of the gas in its production is generally onward from the lime-furnace B to the gas-pipe V.

I will now detail more specifically my apparatus and its method of operation; but for a full description of the general process of producing hydrogen I refer to the C. M. Tessié du Motay patent before specified.

Supposing the chambers B E E E′ E′ to be filled with quicklime and the chambers F F′ with brick or other refractory material, I proceed as follows: I produce heating-gas in my generator A in the same manner as described in the aforesaid patent of C. M. Tessié du Motay, or in any other suitable manner. This I cause to enter the top of the lime-furnace B by the branch pipe K. Air under pressure is caused to flow through the pipe J to cause the combustion of the burning gas in the lime-furnace B. Of course suitable contrivances should be provided for lighting the gas there, as elsewhere in the process where the heating-gas is to be consumed. The heating-gas and other products of combustion then pass to the lime-furnace B and escape through the purge-valve T, which may be opened to allow their escape. The combustion of the gas makes the lime very hot. The lime-furnace B being now filled with hot lime, the purge-valve is closed and a suitable valve opened communicating with the cooler C. Then steam and naphtha, petroleum, or any other suitable hydrocarbon are injected together by the injector H, or they may be brought together by any other means in the lime-furnace B. The steam is preferably superheated, and the heating-gas produced in the chamber A may be used for heating the boiler to produce the steam used in the process, as well as for heating the various converting-chambers. The result of the reaction of the hot lime upon the hot steam and naphtha will be the production of hydrogen and carbonic acid with a very small amount of carbonic oxide, marsh-gas, and additional impurities. The gas produced in this chamber is, however, remarkably free from impurity, and consists essentially of hydrogen, marsh-gas, and carbonic acid. From the lime-furnace B by the pipe $d$ the gas passes onward through the cooler C, which may be constructed in the ordinary way of such contrivances, the gas preferably not coming in contact with the cooling-water, but passing through tubes cooled by such water. Thence the gas passes by the pipe M to the governing-holder D, which holder is adapted to receive the excess of gas which may be at times produced, and to maintain a constant and sufficient pressure to insure the operation of the process in the subsequent steps.

E E and E' E' represent duplicate lime-chambers, through which gas may be passed from the holder D for the purpose of absorbing the carbonic acid. Supposing the chambers E E to be filled with quicklime, either cold or slightly heated, the gas will pass through pipe N to the first lime-chamber E, and from that chamber by pipe W to the second chamber, and thence to the washer P. The effect of these chambers will be to thoroughly purify the gas flowing through them of the carbonic acid which it may contain. It is important to effect a thorough absorption of the carbonic acid—that is, its combination with the quicklime in the chambers E E—that the gas be brought in contact with the lime together with a certain amount of water.

I have provided a steam-supply, $c$, by which an addition of steam may be made, if it is necessary; or, if there should be too much moisture in the gas, it may be condensed in a condenser in the well-known way before it is admitted to the absorption lime-chambers. The result upon the lime will of course be its conversion into carbonate of lime, and it will presently cease to act efficiently in absorbing the carbonic acid, and it then becomes necessary to revivify or reconvert the lime into quicklime, so that it may be subsequently used. In order to accomplish this, the gas is caused to flow through the other chambers, E' E', by suitable valves, and burning gas, air, and steam are brought into contact with the carbonate of lime. The burning gas enters the absorption lime-chambers by the pipes G R R, and the air may be caused to enter from the pipe S. The pipe $c$ will add a certain amount of steam, if it be necessary, and the device $a$ will serve to ignite the gas. Whether an additional amount of steam is to be added or not will depend upon the amount of hydrogen contained in the heating-gas. The products of this combustion escape by the purge-valves T in the well-known way. By the combustion of the heating-gas with a certain amount of hydrogen the carbonate of lime is again converted into quicklime, and the operation may be repeated through the other lime-chambers. I have shown here two sets of lime-chambers of two each; but it is obvious that as many may be employed as is necessary, and more than two may be employed in the series when desired; also, that the chambers might be so arranged in connection with a valve that the gas would flow through all of them except one, and that one might be heated by the heating-gas and reconverted into quicklime and then once more thrown into the series while some other furnace was being purified. Such a contrivance is frequently used in gas-houses, and is generally known as a "center sealing-valve." It is used in connection with the purifying-boxes there.

I have not made full reference to the different valves to be employed, as they will be readily understood by a competent gas-engineer. From the washer P the hydrogen passes to the carburetor and fixing apparatus F. This apparatus is also shown in duplicate, and the refractory material within it should be heated by combustion of the heating-gas with air in the same manner as the lime-chambers E E, but no steam need be added. When one of these chambers has been sufficiently heated the hydrogen is caused to flow through it, and at the same time carbureting material—as, for instance, naphtha, petroleum, or its equivalent—is caused to enter through the pipe $b$. The naphtha will thus be vaporized in the presence of the hydrogen, and subsequently converted into a fixed gas by the hot portions of the refractory material beneath, and it thence passes through the hydraulic main O and gas-pipe V to the distributing-holder.

Instead of the apparatuses F F', I might employ the well-known carburetors and fixing-retorts used in the water-gas process.

The lime-furnace B and the lime-chambers E E E' E' should be constructed of material as free as possible from silex—as, for instance, magnesium, brick, or some equivalent material. It is very important that no glaze should occur upon the surface of the lime, as this would prevent its proper action upon the gases. I have shown here one form of lime-chamber B E E E' E'; but I do not limit myself to this construction, as the gas might enter below instead of above, or be arranged in other ways. I prefer, however, that it should enter above, as shown. By this construction and arrangement I entirely separate my absorption-chambers from my lime-furnace, and I interpose between them a governing-holder, D, in which the temperature of the hot gases produced in the lime-furnace may be greatly reduced before it is brought in contact with the cool lime in the absorption-chambers. It is very important for the proper operation of these chambers that the flow of gas through them be constantly regulated, and that the gas be not so hot as to prevent their proper operation. If the gas be very hot, the lime in them soon ceases to properly perform its function, and the process is at an end.

The invention above described, and set forth hereinafter in claim 1, is distinguished from modes of manufacturing gas heretofore pursued by the maintaining (by a governing-holder) of an even pressure upon the gas. When the gas is stored in an ordinary tank-reservoir the pressure varies according to the supply; but when a holder is used which can be filled with gas or substantially emptied an even pressure is maintained, the amount of carbonic acid which may exist in the gas is rendered uniform throughout the whole body, and the gas is reduced in temperature, so as to produce the proper effect when it is passed to the absorption lime-chambers.

I am aware that illuminating-gas has been made by first producing an impure hydrogen and storing it in a reservoir, and that such gas has been purified by lime at a red heat, and then carbureted, and the mixture fixed in hot retorts. My invention is distinguished from this by the successive treatment with hot and cooler bodies of lime, as set forth.

What I claim as my invention, and desire to secure by Letters Patent, is—

1. The process of producing hydrogen herein described, which consists in bringing any liquid hydrocarbon and steam into contact with a highly-heated body of lime, thereby decomposing the hydrogen compounds contained in the said liquid hydrocarbon and steam, of cooling said product, and of then causing a regulated constant stream under uniform pressure to flow through a chamber or chambers containing lime in a cooler condition than the body of lime first used, for the purpose of absorbing the free carbonic acid which may exist in the gas, substantially as described.

2. The process of manufacturing illuminating-gas, which consists of bringing any liquid hydrocarbon and steam into contact with a highly-heated body of lime, thereby decomposing the hydrogen compounds contained in the said liquid hydrocarbon and steam, and then passing the gaseous products through a body of lime at a lower temperature than that first used, whereby carbonic acid is absorbed, and of then carbureting the produced gas and fixing the same by heat, the whole constituting a continuous series of operations, substantially as described.

3. The combination of the lime-furnace B, the cooler C, the regulating-holder D, and one or more absorption lime-chambers, E, substantially as described.

4. The combination of the lime-furnace B, governing-holder D, one or more lime-chambers, E, and a carburetor and fixing apparatus, F, substantially as described.

5. The combination of the heating-gas generator A, lime-furnace B, one or more absorption lime-chambers, E, and the carburetor and fixing apparatus F, and the connections shown, whereby the heating-gas may be used to heat the lime-furnace, the absorption lime-chamber, and the carburetor at will, substantially as described.

ERAZM J. JERZMANOWSKI.

Witnesses:
GEO. H. EVANS,
WM. A. POLLOCK.